United States Patent Office 3,048,266
Patented Aug. 7, 1962

3,048,266
FOG RESISTANT POLYOLEFIN FILMS
Robert H. Hackhel, Berwyn, and William Sacks, Park Forest, Ill., assignors to Union Carbide Corporation, a corporation of New York
No Drawing. Filed Mar. 29, 1961, Ser. No. 99,058
20 Claims. (Cl. 206—45.34)

This invention relates to the prevention of fogging of polyolefin film surfaces by condensed moisture, and more particularly relates to the prevention of moisture fogging on the surfaces of transparent, self-supporting polyolefin films employed in the packaging of moist food products.

Self-supporting polyolefin films, such as polyethylene film and polypropylene film, are characterized by high resistance to moisture vapor transmission. This property is of particular advantage in the packaging of moist food with these films because the moisture content of the food is thereby substantially retained over long periods of time. Another desirable property of polyolefin films is their transparency, enabling easy visual identification of food products packaged in such films.

Qualitative evidence of polyolefin films' superior resistance to moisture vapor transmission is readily observed in the instance of fresh meats packaged in such films and stored in refrigerators maintained at temperatures above the freezing point of water. Often, within an hour after being packaged and stored, sufficient water evaporates from the meat surface to saturate the air spaces between the film and the meat, and then begins to condense on the inner surfaces of the polyolefin film as minute droplets of water. As more water droplets form on the inner polyolefin surfaces, an overall fogged effect is produced, interfering with visual identification of the meat or other packaged commodity.

Accordingly, it is an object of the present invention to impart to surfaces of polyolefin materials resistance to moisture fogging.

A further object is to impart to self-supporting polyolefin films resistance to moisture fogging.

A further object is to provide melt-extrudable polyolefin compositions, heat-formable into clear, self-supporting films, and particularly characterized by their resistance to surface fogging by humid atmosphere.

The accomplishment of these objectives and others as will become apparent is hereinafter described.

It has been found that the incorporation of specific amounts of esters or ethers of ethylene oxide having the formula:

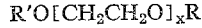

R′O[CH$_2$CH$_2$O]$_x$R wherein $x$ has a value from 1 to 23 inclusive; R is an acyl radical derived from a fat-forming fatty acid having from 12 to 22 carbon atoms inclusive, or a monovalent aliphatic radical having from 12 to 22 carbon atoms inclusive; and R′ is hydrogen or an R[OCH$_2$CH$_2$]$_x$ group wherein $x$ and R have the above identified meaning, in a film-forming polyolefin is unexpectedly effective in causing moisture condensing on the surfaces of film produced therefrom to coalesce into a continuous visually clear film instead of forming a fogged surface comprising individual droplets of water.

The term "anti-fog agent" as herein used, means the above-identified ethylene oxide or polyoxyethylene esters or ethers as well as mixtures of said esters or ethers and one or more compounds for preventing moisture fogging of polyolefin surfaces, such as the monoglycerides of fat-forming fatty acids set forth in copending patent application Serial No. 99,056; sorbitan mono- or di-esters of fat-forming fatty acids set forth in copending patent application Serial No. 99,057; ethylene oxide or polyoxyethylene sorbitan fat-forming fatty acid esters set forth in copending patent application Serial No. 99,038; and ethylene oxide or polyoxyethylene amines or amides set forth in copending patent application Serial No. 99,042; all said patent applications being filed simultaneously herewith. Thus, the anti-fog agent incorporated in the polyolefin can include specified amounts of said ethylene oxide or polyoxyethylene esters or ethers as well as mixtures of said amines and amides and the compounds set forth in the above-identified patent applications. Moreover, it is preferred that said ethylene oxide or polyoxyethylene esters or ethers and mixtures as herein defined have an HLB value from about 4 to 14 inclusive. Anti-fog agents having an HLB value of less than about 4 and more than 14 do not impart optimum anti-fog properties to the film. Also, mixtures of compounds wherein the HLB value of each constituent is outside the specified range and the HLB value of said mixture is within the specified range, do not give desirable anti-fog properties to the film.

The term "HLB" as used herein is defined in the Journal of the Society of Cosmetic Chemists of 1949, pages 311 through 326; and the Journal of the Society of Cosmetic Chemists of 1954, pages 249 through 256. Briefly, the term "HLB" comes from the words "hydrophile-lipophile balance." The HLB method as described in the Journal of the Society of Cosmetic Chemists is a method which assigns numerical values to surfactants, thereby providing a system of classification that is related to their behavior and to their solubility in water. The HLB method is based on the premise that all surfactants combine hydrophilic and lipophilic groups in one molecule and that the proportion between the weight percentages of these two groups for non-ionic surfactants is an indication of the behavior that may be expected from the product.

The term fat-forming fatty acids as herein used is definitive of those fatty acids present as such or as glycerides in natural fats. The Yearbook of Agriculture, 1959 Food, U.S. Department of Agriculture, page 716, defines "fat" as follows:

"A glyceryl ester of fatty acids. Fats generally are substances of plant and animal origin. Fat may be in solid form, as butter, margarine, or other shortening, or in liquid form, as the vegetable oils."

The fatty acids useful in the preparation of ethylene oxide or polyoxyethylene esters of this invention can be prepared by known procedures, as for example, by glycerolysis of natural fats or oils, which are essentially mixtures of various fatty acid triglycerides. Upon glycerolysis of such fats or oils, there is usually obtained a complex mixture including free fatty acids and glycerol. The components of such mixture can be separated by suitable distillation procedures.

Illustrative examples of free fatty acids which can be used for preparing the ethylene oxide or polyoxyethylene esters or ethers of this invention are those obtained by the glycerolysis of such fats or oils as beef tallow, mutton tallow, butter fat, coconut oil, corn oil, cotton seed oil, lard oil, olive oil, peanut oil, soy bean oil and sesame oil.

Illustrative of the monovalent aliphatic radicals represented by R of the aforedescribed formula include alkyl and alkenyl radicals, such as lauryl, stearyl, oleyl and behenyl which can be derived from the corresponding aliphatic alcohols, i.e. lauryl alcohol, stearyl alcohol, oleyl alcohol and behenyl alcohol.

The ethylene oxide esters and ethers can be prepared by known procedures, as for example, reacting the appropriate number of units of ethylene oxide with a fat-forming fatty acid to form the ester or with an aliphatic alcohol to form the ether.

Illustrative of the ethylene oxide esters and ethers thusly formed are set forth in Table I.

TABLE I

| Anti-fog agent: | Average number of units of ethylene oxide (value of $x$) |
|---|---|
| Ethylene oxide monolaurate | 1 |
| Polyoxyethylene monolaurate | 9 |
| Polyoxyethylene monostearate | 9 |
| Polyoxyethylene mono-oleate | 9 |
| Polyoxyethylene monobehenate | 23 |
| Ethylene oxide mono lauryl ether | 1 |
| Polyoxyethylene mono lauryl ether | 9 |
| Polyoxyethylene mono stearyl ether | 9 |
| Polyoxyethylene mono oleyl ether | 9 |
| Polyoxyethylene mono behenyl ether | 23 |
| Polyoxyethylene dilaurate | 2 |
| Polyoxyethylene distearate | 9 |
| Polyoxyethylene dioleate | 9 |
| Polyoxyethylene dibehenate | 23 |
| Polyoxyethylene di lauryl ether | 2 |
| Polyoxyethylene di stearyl ether | 9 |
| Polyoxyethylene di oleyl ether | 9 |
| Polyoxyethylene di behenyl ether | 46 |

It is to be noted that while the anti-fog agents are herein named as derivatives of ethylene oxide, many are commercially known as ethylene glycol derivatives even though both have the same formula. For example, an anti-fog agent having the formula

is commercially known as polyethylene glycol monostearate wherein the polyethylene glycol has a molecular weight of 400, which is equivalent to 9 units of ethylene glycol. However, to have consistent nomenclature the anti-fog agent having the above formula will herein be named polyoxyethylene monostearate. This procedure of uniformly naming anti-fog agents as ethylene oxide derivatives is followed throughout except where otherwise specifically pointed out.

The incorporation of the anti-fog agents in polyolefin materials to impart thereto resistance to moisture fogging can be effected in several ways. In a preferred embodiment, the anti-fog agent is homogeneously incorporated into the polyolefin by heating them together to at least the melting point of the plastic material in a suitable mixing apparatus, such as a Banbury mixer or heated differential mixing rolls, until a homogeneous mixture is formed, solidifying the mixture by cooling and then comminuting the cooled mixture to a particle size satisfactory for hot-melt extrusion or equivalent heat-shaping operation to form films. It will be obvious to those skilled in the art that other methods can also be used to incorporate the anti-fog agent.

The incorporation of an anti-fog agent in the polyolefin material is preferred over other methods, such as coating the polyolefin material with the anti-fog agents, for several reasons. First, in using a coating, a need to find an adequate solvent is present. Moreover, as a matter of economics, the anti-fog agent can simply be incorporated in the polyolefin material by adding it in the processing of the raw polyolefin material; or by adding it to the polyolefin material at the time it is ready to form film. On the other hand, the coating containing an anti-fog agent must be applied after the polyolefin film is formed, thereby necessitating coating and solvent recovery equipment. Thus, overall processing costs are less when the anti-fog agent is incorporated into the polyolefin. Another important reason for preferring the incorporation of the anti-fog agent is that a coating containing an anti-fog agent may be wiped or washed off the polyolefin surfaces. Accordingly, the fog-resistance of the film is greatly impaired, causing an overall fogged effect to thereafter develop on the polyolefin film surfaces when employed as in packaging material, as herein described. In contrast, when the anti-fog agent is incorporated in the polyolefin film, it is generally believed some of the anti-fog agent will remain therein and not migrate to the film surfaces. Thus, when the migrated portion of the anti-fog agent is removed from the film surfaces, that which remains in the film will migrate to the film surfaces. In this manner, the film remains fog resistant, even upon removal of at least the initial portion of the anti-fog agent which has migrated to the film surfaces.

Film-forming polyolefins suitable for the present invention are particularly exemplified by low density polyethylene having a density from at least a film-forming grade to 0.935 gram per cubic centimeter at 25° C.; high density polyethylene of more than 0.935 gram per cubic centimeter at 25° C. and preferably from 0.94 to 0.98 gram per cubic centimeter at 25° C.; polypropylene having a density of at least about 0.88 gram per cubic centimeter at 25° C.; copolymers of ethylene and propylene; and polymers obtained from ethylene or propylene copolymerized with minimal amounts of other mono-olefinic monomers such as butene, isobutylene, acrylic acids, esters of acrylic acids, styrene or combinations thereof such that the melting point of the final copolymer is not more than 10° C. different from the corresponding low density polyethylene homopolymer; or such that the crystallintiy of the corresponding high density polyethylene or polypropylene homopolymer is not significantly lessened.

The anti-fog agent of the present invention is incorporated in the above-described film-forming polyolefins in an amount which imparts fog resistance to the film and not more than that which does not appear to further improve the anti-fog properties of the film and/or not more than that which adversely affects the other normally desired physical characteristics of the polyolefin films produced therefrom. It has been found that if an excess amount of anti-fog agent is incorporated in the polyolefin film, it tends to be tacky and has a greasy feel. The blocking and slip properties of the film are also adversely affected. Moreover, an excess of anti-fog agent in the film adversely affects the adhesive of inks thereto.

Thus, to produce about a 1 mil thick fog-resistant low density polyethylene film without adversely affecting its other normally desired properties, the anti-fog agent is added in amounts from about 0.05 percent to 1.0 percent by weight of the polyethylene and preferably from about 0.1 percent to 0.75 percent by weight of the polyethylene. Incorporation of less than about 0.05 percent by weight of the anti-fog agent into the polyethylene does not result in any appreciable improvement in the anti-fog properties of the films produced from those compositions. Incorporation of more than about 1.0 percent by weight of the anti-fog agent into the polyethylene does not appear to further improve the anti-fog properties of the films produced therefrom. In addition, the resultant film has a tendency to be tacky, and the feel, slip, blocking and ink adhesion properties of said film are adversely affected when more than about 1.0 percent by weight of the anti-fog agent is incorporated therein.

To impart fog-resistance to a 1 mil thick high density polyethylene film or polypropylene film without adversely affecting the other normally desired properties of the films from about 0.5 percent to 2.5 percent by weight of polyolefin and preferably from about 0.5 percent to 2.0 percent by weight of polyolefin of anti-fog agent can be incorporated into the high density polyethylene or polypropylene.

Optimumly, the concentration of the anti-fog agent in the film will vary with the thickness of the film. Since thinner films have a greater surface area per unit weight of film than do thicker films, a greater concentration of the anti-fog agent will be necessary to produce optimum results in thinner films than that necessary for thicker films. As an example of this, 0.1 to 0.2 percent by weight of polyethylene of the anti-fog agent in 1.5 mil low density polyethylene film produces excellent anti-fog characteristics, while 0.2 to 0.3 percent by weight of polyethylene of said anti-fog agent in 0.75 mil thick low density polyethylene film produces the same excellent results. The optimum concentration for each particular thickness of the film can be readily determined by simple empirical tests.

The normally added materials, such as fillers, stabilizers, plasticizers, colorants, slip agents, anti-blocking agents, anti-static, antioxidant and the like can be added to the compositions of this invention, provided however, they are present in minimal amounts which will not offset the anti-fog characteristic improvements in these compositions.

Anti-fog compositions of this invention can be extruded into self-sustaining films or can be coated onto base films by any of the methods known to the art. Preferably, however, when seamless tubing is desired, the compositions are extruded by the blown-tube method disclosed in U.S. Patent 2,461,975 to Fuller and U.S. Patent 2,461,976 to Schenk. These methods comprise, in general, melt extruding the thermoplastic composition through an annular die in the form of a seamless tubing, drawing the tubing from the die, and thereafter cooling, flattening and winding the tubing on reels. A bubble of a gaseous medium is maintained within the tubing between the annular die and the flattening means to distend the tubing to the desired diameter. Sheeting can be made from the tubing by cutting either one or both of the longitudinal edges.

The resulting fog-resistant polyolefin films are transparent and can be biaxially oriented by any methods known to the art. Also, these films printed satisfactorily after suitable treatment of said film by methods known in the art, such as by subjecting the film to the action of corona discharge, flame treatment, chlorination, etc. Furthermore, such films can be heat sealed.

The following examples serve to further illustrate the invention, but are not to be construed in limitation thereof.

*Examples 1–22*

Polyethylene having a melt index of 2.0 and a density of .921 gram per cc. at 25° C. was placed on a differential two-roll mill having a roll temperature of about 250° F. The ratio of the roll speed was approximately 1.4 to 1 with the slower roll turning at about 20 r.p.m. The polyolefin was heated until softened and a commercial ester or ether set forth in Table II in the amounts specified was added thereto. It is to be noted that the anti-fog agents are named as commercially available, even though both have the same formula as herein described. Where the anti-fog agent is commercially available as an ethylene glycol derivative, the corresponding ethylene oxide designation therefor is given within the brackets. The polyethylene and appropriate anti-fog agent were milled together on the heated differential two-roll mill for approximately 30 minutes until a homogeneous mixture was obtained. The composition was removed from the mill, cooled and cut to suitable particle size for melt extrusion. Each composition was then formed into film having a thickness set forth in Table II by the blown-tube method set forth in U.S. Patent 2,461,975. The tubular film was slit to form sheeting and the anti-fog properties determined as outlined below with the results being recorded in Table II.

Similarly, the incorporation of specific amounts of anti-fog agents as herein described in high density polyethylene and polypropylene imparts the desired fog-resistant properties to films made from such compositions.

As a control, the same polyethylene used in preparing these film compositions, but without an anti-fog agent, was melt extruded into film by the same method. Comparative fogging tendency of said control film was recorded in Table II.

The test used to determine the anti-fog properties of the film was as follows. A 250 ml. beaker was filled to within ½ inch of the top with water at 120° F. A 4" x 4" piece of film was quickly fastened over the mouth of the beaker with a rubber band. Observations were made periodically as to the nature of the water and condensation on the inner surface of the film. The results are recorded in Table II.

TABLE II

| Example | Anti-fog Agent | Molecular Weight of Polyethylene Glycol Ester | Average Number of Units of Ethylene Oxide (Value of X) | HLB Values | Concentration [1] of Esters or Ethers in Polyethylene | Film Thickness (mils) | Time Required For Water Vapor Coalescence into Clear Visual Film at Film Surface |
|---|---|---|---|---|---|---|---|
| 1 | Polyethylene glycol monostearate (polyoxyethylene monostearate) | 400 | 9 | 11.6 | 0.1 | 1.0 | one hour. |
| 2 | Polyethylene glycol monostearate (polyoxyethylene monostearate) | 400 | 9 | 11.6 | 0.4 | 1.0 | immediate. |
| 3 | Polyethylene glycol monolaurate (polyoxyethylene monolaurate) | 400 | 9 | 13.1 | 0.4 | 1.0 | Do. |
| 4 | Polyethylene glycol mono-oleate (polyoxyethylene mono-oleate) | 400 | 9 | 11.4 | 0.1 | 1.5 | one hour. |
| 5 | Polyethylene glycol monostearate (polyoxyethylene monostearate) | 600 | 13 | -------- | 0.1 | 1.5 | Do. |
| 6 | Polyethylene glycol mono-oleate (polyoxyethylene mono-oleate) | 600 | 13 | -------- | 0.1 | 1.5 | Do. |
| 7 | Polyethylene glycol dioleate (polyoxyethylene dioleate) | 400 | 9 | -------- | 0.1 | 1.0 | 10 minutes. |
| 8 | Polyethylene glycol distearate (polyoxyethylene distearate) | 600 | 13 | 8.5 | 0.1 | 1.0 | 5 minutes. |
| 9 | Polyethylene glycol dioleate (polyoxyethylene dioleate) | 600 | 13 | -------- | 0.1 | 1.0 | 2 hours. |
| 10 | Polyethylene glycol dioleate (polyoxyethylene dioleate) | 600 | 13 | -------- | 0.4 | 1.5 | 1–8 hours. |
| 11 | Polyoxyethylene oleate | ---------- | 8 | 11.1 | 0.4 | 1 | 5–60 minutes. |
| 12 | Polyoxyethylene stearate | ---------- | 8 | 11.1 | 0.4 | 1 | Immediately. |
| 13 | Polyoxyethylene stearate | ---------- | 5 | -------- | 0.1 | 1 | 4 hours. |
| 14 | Polyoxyethylene stearate | ---------- | 5 | -------- | 0.5 | 1 | Immediately. |
| 15 | Polyoxyethylene stearate | ---------- | 15 | -------- | 0.1 | 1 | 8 hours. |
| 16 | Polyoxyethylene stearate | ---------- | 15 | -------- | 0.5 | 1 | 40 Minutes. |
| 17 | Polyoxyethylene coco fatty acids. | ---------- | 5 | -------- | 0.1 | 1 | ½–1 Hour. |
| 18 | Polyoxyethylene coco fatty acids. | ---------- | 5 | -------- | 0.5 | 1 | Immediate. |

See footnotes at end of table.

TABLE II.—Continued

| Example | Anti-fog Agent | Average Number of Units of Ethylene Oxide (Value of X) | HLB Values | Concentration[1] of Esters or Ethers on Polyethylene | Film Thickness (mils) | Time Required For Water Vapor Coalescence into Clear Visual Film at Film Surface |
|---|---|---|---|---|---|---|
| 19 | Polyoxyethylene coco fatty acids. | 15 | | 0.1 | 1 | 8 Hours. |
| 20 | Polyoxyethylene coco fatty acids. | 15 | | 0.5 | 1 | 40 Minutes. |
| 21 | Polyoxyethylene lauryl ether | 4 | 9.5 | 0.1 | 1 | 15 Minutes. |
| 22 | Polyoxyethylene lauryl ether | 4 | 9.5 | 0.5 | 1 | Immediate. |
| Control | None | | | | 1.0 | (2) |

[1] "Concentration" of anti-fog agent in polyethylene is percent by weight of polyethylene.
[2] Water vapor at film surface did not coalesce but remained in the form of extremely fine to small droplets such that the film was opaque-translucent after a 24 hour exposure.

Thus, the foregoing clearly shows that the incorporation of specific amounts of anti-fog agents herein described in polyolefins imparts fog resistance properties to the film made from such compositions.

In addition to imparting fog resistance to polyolefin films, the anti-fog agents herein described do not adversely affect the transparency of such films. Accordingly, these polyolefin films are admirably suited for packaging or containing fresh meats, vegetables, flowers and other moisture-emitting products without interfering with visual identification of the packaged commodity because the polyolefin film is transparent and because water droplets condensing on the inside of the polyolefin packaging material will be coalesced into a clear visual film.

As described herein, the invention is of special utility in improving the resistance to fogging of self-supporting polyolefin films as particularly exemplified by polyethylene and polypropylene. It will be appreciated by those skilled in the art that the polyoxyethylene esters herein described and contemplated can also be incorporated into a polyolefin coating composition and the polyolefin coating composition applied to a base surface: as for example, incorporating the anti-fog agent into a polyethylene coating composition and melt extruding the coating compositions onto a regenerated cellulose substrate film by methods known to those in the art.

It will be obvious to those skilled in the art that various other changes can be made without departing from the spirit and scope of the present invention.

What is claimed is:

1. A film-forming composition comprising a homogeneous mixture of a polyolefin and as an anti-fog agent an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said anti-fog agent being present in an amount imparting resistance to moisture fogging and less than that imparting tackiness to a polyolefin film formed from said film-forming composition.

2. A film-forming composition comprising a homogeneous mixture of a polyolefin material selected from the group consisting of low density polyethylene, high density polyethylene and polypropylene, and an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said ethylene oxide derivative being present in an amount imparting resistance to moisture fogging and not more than about 1.0 percent by weight of polyolefin in the instance of low density polyethylene and not more than about 2.5 percent by weight of polyolefin in the instance of high density polyethylene and polypropylene.

3. A film-forming composition comprising a homogeneous mixture of a polyolefin material selected from the group consisting of low density polyethylene, high density polyethylene and polypropylene, and an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said ethylene oxide derivative being present in an amount from about 0.05 to 1.0 percent by weight of polyolefin in the instance of low density polyethylene and from about 0.5 to 2.5 by weight of polyolefin in the instance of high density polyethylene and polypropylene, to impart to film formed from said composition resistance to moisture fogging.

4. The film-forming composition according to claim 3 wherein said ethylene oxide derivative is polyoxyethylene monostearate containing as an average number from about 8 to 13 ethylene oxide units.

5. The film-forming composition according to claim 3 wherein said ethylene oxide derivative is polyoxyethylene monolaurate containing as an average number about 8 ethylene oxide units.

6. The film-forming composition according to claim 3 wherein said ethylene oxide derivative is polyoxyethylene monooleate containing as an average number from about 8 to 13 ethylene oxide units.

7. The film-forming composition according to claim 3 wherein said ethylene oxide derivative is polyoxyethylene distearate containing as an average number about 13 ethylene oxide units.

8. The film-forming composition according to claim 3 wherein said ethylene oxide derivative is polyoxyethylene monolauryl ether containing as an average number about 4 ethylene oxide units.

9. A transparent polyolefin film having homogeneously dispersed therein as an anti-fog agent an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $$R[OCH_2CH_2]_x$$

group wherein R and $x$ have the above-identified meaning, said anti-fog agent being present in an amount to impart resistance to moisture fogging and less than that imparting tackiness to said film.

10. A transparent polyolefin film resistant to fogging upon exposure to a humid atmosphere, wherein said polyolefin is selected from the group consisting of low density polyethylene, high density polyethylene and polypropylene, said film having homogeneously dispersed therein an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said member being present in an amount imparting resistance to moisture fogging and not more than about 1.0 percent by weight of polyolefin in the instance of low density polyethylene and not more than about 2.5 percent by weight of polyolefin in the instance of high density polyethylene and polypropylene.

11. A transparent self-supporting polyolefin film resistant to fogging upon exposure to a humid atmosphere wherein said polyolefin is selected from the group consisting of low density polyethylene, high density polyethylene and polypropylene, said film having homogeneously dispersed therein an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said ethylene oxide derivative being present in an amount from about 0.05 to 1.0 percent by weight of polyolefin in the instance of low density polyethylene and from about 0.5 to 2.5 percent by weight polyolefin in the instance of high density polyethylene and polypropylene, to impart to film formed from said composition resistance to moisture fogging.

12. The polyolefin film according to claim 11 wherein said ethylene oxide derivative is polyoxyethylene monostearate containing as an average number from about 8 to 13 ethylene oxide units.

13. The polyolefin film according to claim 11 wherein said ethylene oxide derivative is polyoxyethylene monolaurate containing as an average number about 8 ethylene oxide units.

14. The polyolefin film according to claim 11 wherein said ethylene oxide derivative is polyoxyethylene monooleate containing as an average number from about 8 to 13 ethylene oxide units.

15. The polyolefin film composition according to claim 11 wherein said ethylene oxide derivative is polyoxyethylene distearate containing as an average number about 13 ethylene oxide units.

16. The polyolefin film according to claim 11 wherein said ethylene oxide derivative is polyoxyethylene monolauryl ether containing as an average number about 4 ethylene oxide units.

17. A package which contains a water emitting material and is formed of a polyolefin wrapping film having homogeneously dispersed therein as an anti-fog agent an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said anti-fog agent being present in an amount to impart resistance to moisture fogging and less than that which imparts tackiness to said film.

18. A package which contains a water emitting material and is formed of a polyolefin wrapping film wherein said polyolefin is selected from the group consisting of low density polyethylene, high density polyethylene and polypropylene, and has homogeneously incorporated therein an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said ethylene oxide derivative being present in an amount imparting resistance to moisture-fogging and not more than about 1.0 percent by weight of polyolefin in the instance of low density of polyethylene and not more than about 2.5 percent by weight of polyolefin in the instance of high density polyethylene and polypropylene.

19. A package which contains a water emitting material and is formed of low density polyethylene wrapping film having homogeneously dispersed therein an ethylene oxide derivative having the formula $$R'O[CH_2CH_2O]_xR$$

wherein $x$ has a value of 1 to 23 inclusive; R is selected from the glass consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said ethylene oxide derivative being present in an amount from about 0.05 percent to 1.0 percent by weight of polyethylene to impart to said polyethylene film resistance to moisture fogging.

20. A package which contains a water emitting material and is formed of a polyolefin wrapping film selected from the group consisting of high density polyethylene and polypropylene having homogeneously dispersed therein an ethylene oxide derivative having the formula $$R'O[CH_2CH_2O]_xR$$

wherein $x$ has a value of 1 to 23 inclusive; R is selected from the class consisting of an acyl radical derived from a fat-forming fatty acid having from 12 to 22 carbon atoms inclusive and a monovalent aliphatic radical having from 12 to 22 carbon atoms inclusive; and R' is selected from the group consisting of hydrogen and an $R[OCH_2CH_2]_x$ group wherein R and $x$ have the above-identified meaning, said ethylene oxide derivative being present in an amount from about 0.5 percent to 2.5 percent by weight of polyolefin to impart to said polyolefin film resistance to moisture fogging.

No references cited.